(12) United States Patent
Lin et al.

(10) Patent No.: US 12,075,281 B2
(45) Date of Patent: Aug. 27, 2024

(54) FEEDBACK INFORMATION DETERMINING METHOD AND APPARATUS, AND TERMINAL

(71) Applicant: GUANGDONG OPPO MOBILE TELECOMMUNICATIONS CORP., LTD., Guangdong (CN)

(72) Inventors: Yanan Lin, Dongguan (CN); Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 374 days.

(21) Appl. No.: 17/452,497

(22) Filed: Oct. 27, 2021

(65) Prior Publication Data

US 2022/0053533 A1  Feb. 17, 2022

Related U.S. Application Data

(63) Continuation of application No. PCT/CN2019/085320, filed on Apr. 30, 2019.

(51) Int. Cl.
*H04L 1/1607* (2023.01)
*H04L 1/1812* (2023.01)
(Continued)

(52) U.S. Cl.
CPC ........... *H04W 28/04* (2013.01); *H04L 1/1614* (2013.01); *H04L 1/1812* (2013.01);
(Continued)

(58) Field of Classification Search
CPC .......... H04L 1/12–1896; H04L 5/0001–0098; H04W 8/18–245; H04W 24/02–10;
(Continued)

(56) References Cited

U.S. PATENT DOCUMENTS

| 2011/0206024 A1 | 8/2011 | Lee |
| 2012/0320805 A1 | 12/2012 | Yang et al. |

(Continued)

FOREIGN PATENT DOCUMENTS

| CN | 109075921 A | 12/2018 |
| CN | 109451800 A | 3/2019 |

(Continued)

OTHER PUBLICATIONS

CMCC "Outstanding Issues for multiple SPSs/CGs Support", 3GPP Draft; R2-1902551, vol. RAN WG2, No. Athens, Greece; Feb. 25, 2019-Mar. 1, 2019 Mar. 1, 2019 (Mar. 1, 2019), XP051603785. 7 pages.

(Continued)

*Primary Examiner* — Timothy J Weidner
(74) *Attorney, Agent, or Firm* — Perkins Coie LLP

(57) ABSTRACT

A feedback information determining method and apparatus, and a storage medium. The method comprises: a terminal determines, according to the position of each transmission resource in multiple transmission resources, a HARQ process index corresponding to the transmission resource; the terminal determines a first feedback information codebook according to the HARQ process indexes corresponding to the multiple transmission resources, wherein the first feedback information codebook comprises feedback information corresponding to the multiple transmission resources.

15 Claims, 11 Drawing Sheets

---

301 — A terminal determines a HARQ process index corresponding to each transmission resource according to a position of each of multiple transmission resources 302 — The terminal determines a first feedback information codebook according to HARQ process indexes corresponding to the multiple transmission resources, and the first feedback information codebook includes feedback information corresponding to the multiple transmission resources

(51) Int. Cl.
| | |
|---|---|
| *H04L 1/1822* | (2023.01) |
| *H04L 1/1829* | (2023.01) |
| *H04L 5/00* | (2006.01) |
| *H04W 28/04* | (2009.01) |
| *H04W 28/10* | (2009.01) |
| *H04W 72/02* | (2009.01) |
| *H04W 72/11* | (2023.01) |
| *H04W 72/1273* | (2023.01) |
| *H04W 72/21* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 1/1822* (2013.01); *H04L 1/1861* (2013.01); *H04L 5/0053* (2013.01); *H04L 5/0055* (2013.01); *H04W 28/10* (2013.01); *H04W 72/02* (2013.01); *H04W 72/11* (2023.01); *H04W 72/1273* (2013.01); *H04W 72/21* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 28/02–26; H04W 48/02–20; H04W 56/001–0025; H04W 72/02–569; H04W 74/002–008; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2013/0286905 A1 | 10/2013 | Yang et al. | |
| 2015/0237619 A1 | 8/2015 | Yang et al. | |
| 2016/0150527 A1 | 5/2016 | Yang et al. | |
| 2017/0164354 A1 | 6/2017 | Yang et al. | |
| 2018/0019843 A1 | 1/2018 | Papasakellariou | |
| 2018/0302128 A1 | 10/2018 | Akkarakaran et al. | |
| 2019/0363840 A1* | 11/2019 | Wang | H04L 1/1861 |
| 2020/0295882 A1* | 9/2020 | Wang | H04L 1/1861 |
| 2021/0344455 A1 | 11/2021 | Choi et al. | |
| 2022/0052790 A1* | 2/2022 | Lei | H04L 1/1822 |

FOREIGN PATENT DOCUMENTS

| | | |
|---|---|---|
| CN | 109478978 A | 3/2019 |
| CN | 109565373 A | 4/2019 |
| CN | 109586877 A | 4/2019 |
| EP | 3673607 A1 | 7/2020 |
| EP | 3879736 A1 | 9/2021 |
| WO | 2018191606 A1 | 10/2018 |

OTHER PUBLICATIONS

Huawei "Feature lead summary of HARQ enhancements for NR-U" 3GPP TSG RAN WG1 Meeting #96bis R1-1905649, Xi'an, China, Apr. 8-12, 2019. 29 pages.
Office Action of the Indian application No. 202127050123, issued on Mar. 31, 2022. 6 pages with English translation.
OPPO "Summary#2 on UCI enhancements for URLLC" 3GPP TSG RAN WG1 #96bis R1-190xxxx(R1-1905829), Xi'an, China, Apr. 8-12, 2019. 10 pages.
Supplementary European Search Report in the European application No. 19927328.5, mailed on Mar. 9, 2022. 11 pages.
Written Opinion of the International Search Authority in the international application No. PCT/CN2019/085320, mailed on Jan. 22, 2020. 10 pages with English translation.
International Search Report in the international application No. PCT/CN2019/085320. mailed on Jan. 22, 2020.
3GPP. "NR; Medium Access Control (MAC) Protocol Specification" 3GPP TS 38.321 VI5.5.0,Apr. 9, 2019 (Apr. 9, 2019),section 5.3.
Ericsson. "On HARQ Codebook" 3GPP TSG-RAN WG1 Meeting#90 RI-1714440,Aug. 12, 2017 (Aug. 12, 2017) section 2.
Huawei, "Feature lead summary of HARQ enhancements for NR-U", 3GPP TSG RAN WG1 Meeting #96 R1-1903423, Feb. 25-Mar. 1, 2019. 13 pages.
First Office Action of the Chinese application No. 201980020634.4, issued on Nov. 8, 2022. 20 pages with English translation.

* cited by examiner

FEEDBACK INFORMATION DETERMINING METHOD AND APPARATUS, AND TERMINAL

CROSS-REFERENCE TO RELATED APPLICATION

This is a continuation application of International Patent Application No. PCT/CN2019/085320 filed on Apr. 30, 2019, the contents of which are hereby incorporated by reference in its entirety.

TECHNICAL FIELD

Embodiments of the present disclosure relate to the technical field of mobile communication, and more particular, to a method and device for determining feedback information and a terminal.

RELATED ARTS

The manner for data transmission in New Radio (NR) Rel-15 includes two types: dynamic transmission and semi-persistent/semi-static transmission. The dynamic transmission is characterized in that parameters of each data transmission are indicated by corresponding downlink control information. The semi-persistent/semi-static transmission is characterized in that both transmission resources and transmission manner are configured in semi-persistent/semi-static, and the downlink control information is used to activate/release corresponding semi-persistent/semi-static transmission. Once activation is performed, no physical layer signaling is required for subsequent transmissions.

On the other hand, it is specified in the Rel-15 that after the terminal receives a HARQ process, the HARQ process cannot be scheduled again until the corresponding Acknowledgement/Negative Acknowledgement (ACK/NACK) information is fed back. According to the existing HARQ codebook design, when the semi-persistent/semi-static transmission period is shortened, it may cause high feedback overhead and seriously affect the transmission efficiency.

SUMMARY

Embodiments of the present disclosure provide a method and device for determining feedback information and a terminal.

The embodiments of the disclosure provide a method for determining feedback information, which includes the following operations.

A terminal determines a hybrid automatic repeat request (HARQ) process index corresponding to each transmission resource according to a position of each of a plurality of transmission resources.

The terminal determines a first feedback information codebook according to HARQ process indexes corresponding to the plurality of transmission resources. The first feedback information codebook includes feedback information corresponding to the plurality of transmission resources.

The embodiments of the disclosure provide a device for determining feedback information, which includes a first determining unit and a second determining unit.

The first determining unit is configured to determine a HARQ process index corresponding to each transmission resource according to a position of each of a plurality of transmission resources.

The second determining unit is configured to determine a first feedback information codebook according to HARQ process indexes corresponding to the plurality of transmission resources. The first feedback information codebook includes feedback information corresponding to the plurality of transmission resources.

The embodiments of the disclosure provide a terminal, which includes a processor and a memory. The memory is configured to store a computer program, and the processor is configured to call and run the computer program stored in the memory to execute the method for determining feedback information described above.

The embodiments of the disclosure provide a device, which is used to achieve the method for determining feedback information described above.

Specifically, the device includes a processor. The processor is configured to call a computer program from a memory and run the computer program, to cause a device mounted with a chip to execute the method for determining feedback information described above.

The embodiments of the disclosure provide a computer readable storage medium. The computer readable storage medium is used to store a computer program that causes the computer to execute the method for determining feedback information described above.

The embodiments of the disclosure provide a computer program product, which includes a computer program instruction that causes a computer to execute the method for determining feedback information described above.

The embodiments of the disclosure provide a computer program. The computer program, when running on a computer, causes the computer to execute the method for determining feedback information described above.

BRIEF DESCRIPTION OF THE DRAWINGS

The drawings described herein are intended to provide a further understanding of the present disclosure and form a part of the present disclosure. The schematic embodiments of the present disclosure and the description thereof are intended to explain the present disclosure and do not constitute an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Long Term Evolution (LTE) system, an LTE Frequency Division Duplex (FDD) system, an LTE Time Division Duplex (TDD), a 5G system or a future communication system.

Figure 1:
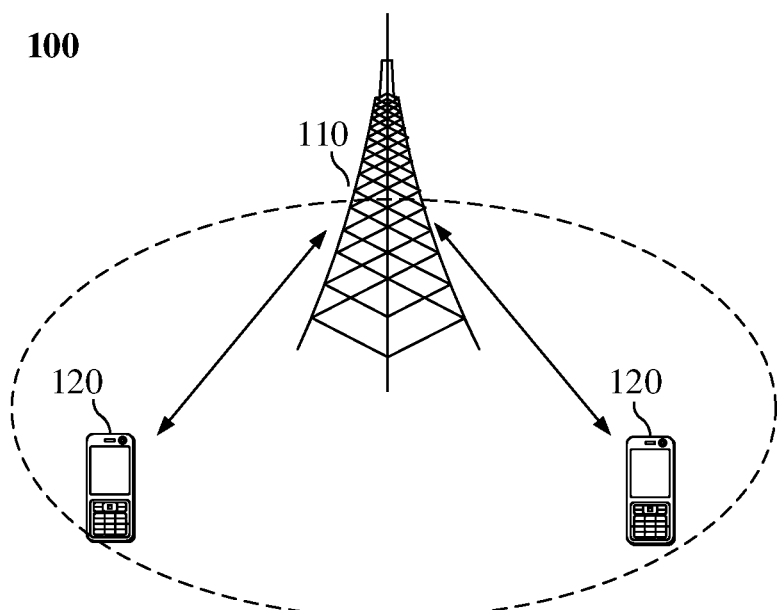
FIG. 1 is a schematic diagram of a communication system architecture according to an embodiment of the present disclosure.

Exemplarily, a communication system 100 to which the embodiments of the present disclosure are applied is illustrated in FIG. 1. The communication system 100 may include a network device 110. The network device 110 may be a device communicating with a terminal device 120 (also referred to as a communication terminal, a terminal). The network device 110 may provide communication coverage for a specific geographic area and may communicate with a terminal device within the coverage area. In at least one example, the network device 110 may be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN) or the like.

The communication system 100 also includes at least one terminal 120 located within the coverage of the network device 110. The terminal 120 may communicate with the network device 110 via wireless or wired. A terminal configured to communicate via a wireless interface may be referred to as a "wireless communication terminal", "wireless terminal" or "mobile terminal". The terminal may be referred to an access terminal, a User Equipment (UE), a subscriber unit, a subscriber station, a mobile station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited in the embodiments of the present disclosure.

In one example, the communication system 100 may also include other network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, the communication system 100 may include the network device 110 and the terminal 120 with the communication function. The network device 110 and the terminal 120 may be specific devices mentioned above, and details are not described herein. The communication system 100 may further include other communication devices, for example, other network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present disclosure, the related concepts related to the embodiments of the present disclosure are described below.

HARQ Codebook

Figure 2:
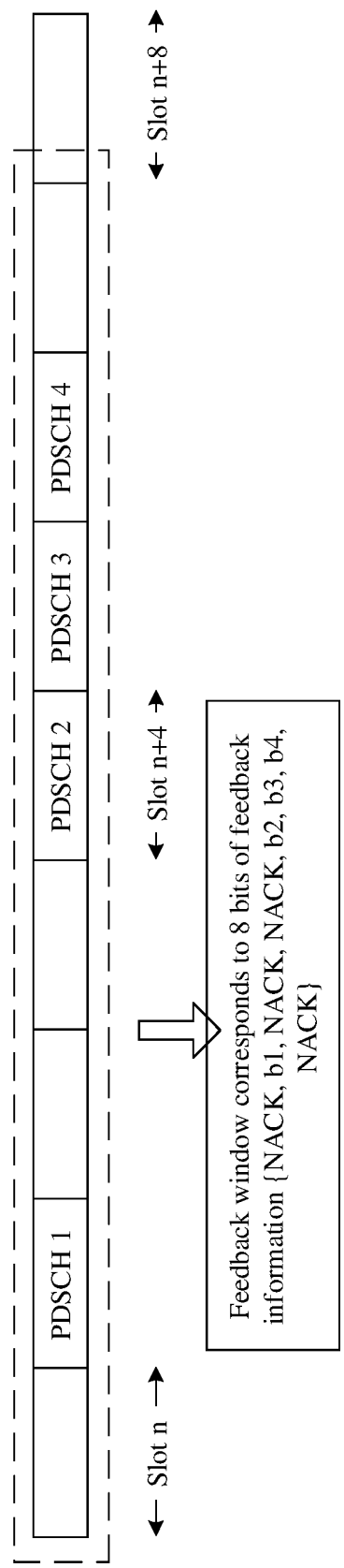
FIG. 2 is a schematic diagram of a PDSCH in a feedback window according to an embodiment of the present disclosure.

NR Rel-15 supports two generation manners for HARQ feedback information, i.e., semi-static HARQ codebook (i.e., Type-1 HARQ-ACK codebook) and dynamic HARQ codebook (i.e., Type-2 HARQ-ACK codebook). The number of feedback information bits included in the semi-static HARQ codebook is determined according to semi-static configuration parameters (HARQ time sequence set, PDSCH-TimeDomainResourceAllocationList, etc.). The essential meaning is that the feedback information bits included in the codebook correspond to each physical resource of physical downlink shared channels (PDSCHs) that can be transmitted in a feedback window configured in semi-static. The number of actually scheduled PDSCHs is less than or equal to the number of physical resources capable of transmitting PDSCHs in the feedback window. For a certain physical resource capable of transmitting the PDSCH, if the terminal does not receive DCI format 1_0 or DCI format 1_1 scheduled to transmit the PDSCH on the resource, the terminal sets NACK on a feedback information bit corresponding to the resource; otherwise, the actual decoding result is set on the corresponding feedback information bit, as illustrated in FIG. 2, bi represents a decoding result corresponding to PDSCH i (i.e., feedback information).

For the dynamic HARQ codebook, the terminal determines the number of feedback information bits of the codebook according to downlink allocation index (DAI) information field in the downlink control information (DCI) corresponding to the actually received PDSCH, and each feedback information bit is an actual decoding result. Taking FIG. 2 as an example, the dynamic HARQ codebook is {b1, b2, b3, b4}.

Data Transmission Manner

In the NR system, data transmission manner includes two types: dynamic transmission and semi-persistent/semi-static transmission. The dynamic transmission is characterized in that parameters of each data transmission are indicated by corresponding DCI, and the specific DCI includes information such as physical resources used by the PDSCH and HARQ process indexes. The semi-persistent/semi-static transmission is characterized in that both transmission resources and transmission manners are configured in semi-persistent/semi-static, and corresponding semi-persistent scheduling (SPS) transmission is activated/released through the DCI.

In the NR Rel 15, the terminal is configured with at most one set of SPS transmission parameters with a shortest period of 10 ms. Once the SPS transmission is activated, the base station always transmits one SPS PDSCH in a case that there are no dynamic scheduling within the same time resource. The HARQ process index of SPS PDSCH is calculated by the following formula: HARQ Process ID=[floor (CURRENT_slot×10/(numberOfSlotsPerFrame×periodicity))] modulo nrofHARQ-Processes, where CURRENT_slot=[(SFN×numberOfSlotsPerFrame)+slot number in the frame], numberOfSlotsPerFrame is the number of consecutive time slots included in a frame, and periodicity is an SPS transmission period. The terminal also always transmits ACK/NACK information corresponding to the SPS PDSCH.

In the NR Rel 16, to better support Ultra-Reliable Low Latency Communication (URLLC), it is proposed to configure multiple sets of SPS transmission parameters for one terminal, and the SPS period may be shortened to a minimum of 2 symbols. The above HARQ process index calculation manner needs to be enhanced to support short-period SPS transmission. When the SPS period is shortened, if the existing ACK/NACK feedback mechanism is still adopted, a large number of SPS transmission opportunities exist in the feedback window, and the HARQ process indexes calculated by different SPS transmission opportunities according to time resources may be the same. If the terminal always generates the HARQ codebook according to the number of reserved configuration resources, the feedback overhead will be large. If the terminal generates the HARQ codebook according to the received SPS PDSCH, since there is no similar DAI information, when the base station sends a certain SPS PDSCH and the terminal fails to detect it, the understanding of the HARQ codebook by the terminal and the base station may be inconsistent, thereby causing a wrong understanding of all the ACK/NACK information carried in the HARQ codebook, and seriously affecting the transmission reliability. Therefore, the following technical solution of the embodiments of the present disclosure is proposed.

Figure 3:
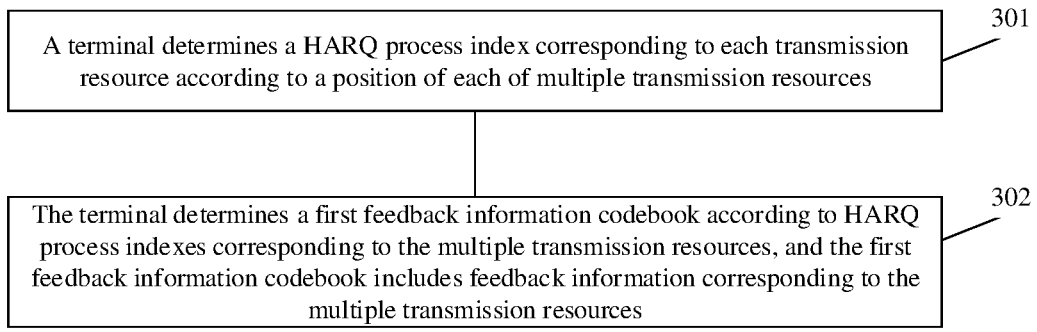
FIG. 3 is a schematic flowchart of a method for determining feedback information according to an embodiment of the present disclosure.

FIG. 3 is a schematic flowchart of a method for determining feedback information according to an embodiment of the present disclosure. As illustrated in FIG. 3, the method for determining feedback information includes the following operations.

In S301, a terminal determines a HARQ process index corresponding to each transmission resource according to a position of each of multiple transmission resources.

In one implementation of the present disclosure, the transmission resource is an SPS resource. For example, the terminal is configured with one or more sets of SPS transmission parameters, and the terminal determines multiple SPS resources according to the one or more sets of SPS transmission parameters. Accordingly, the multiple transmission resources are allocated to the SPS PDSCH.

In the embodiment of the present disclosure, the terminal determines the HARQ process indexes corresponding to the transmission resources according to time-domain positions of the transmission resources. For example, the HARQ process index may be calculated by the following formula: HARQ Process ID=[floor (CURRENT_slot×10/(numberOfSlotsPerFrame×periodicity))] modulo nrofHARQ-Processes, where CURRENT_slot=[(SFN×numberOfSlotsPerFrame)+slot number in the frame], and numberOfSlotsPerFrame is the number of consecutive time slots included in a frame.

It should be noted that the HARQ process indexes corresponding to the transmission resources refer to HARQ process indexes of the downlink data transmitted on the transmission resources.

In S302, the terminal determines a first feedback information codebook according to HARQ process indexes corresponding to the multiple transmission resources, and the first feedback information codebook includes feedback information corresponding to the multiple transmission resources.

In the embodiments of the present disclosure, the first feedback information codebook includes multiple feedback information bits, and different feedback information bits in the multiple feedback information bits associate with different HARQ process indexes.

In the embodiment of the present disclosure, responsive to that HARQ process indexes corresponding to at least two transmission resources in the multiple transmission resources are the same, the at least two transmission resources correspond to a same feedback information bit in the first feedback information codebook. In this way, the uplink feedback overhead can be effectively reduced.

Generation of the first feedback information codebook and feedback information content included in the first feedback information codebook are described below.

First Feedback Information Code

The first feedback information code may be generated in either of the following two manners.

Manner 1: the multiple feedback information bits are ordered according to an order of the HARQ process indexes corresponding to the multiple transmission resources.

Further, multiple feedback information bits may be obtained (i.e., the first feedback information codebook may be obtained) according to an ascending order of HARQ process indexes corresponding to the multiple transmission resources.

Figure 4:
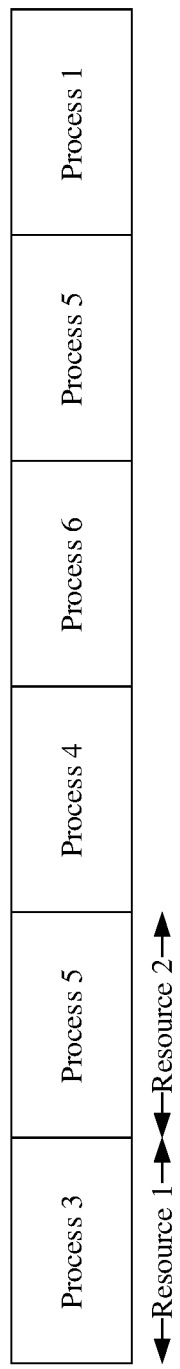
FIG. 4 is a first application schematic diagram according to an embodiment of the present disclosure.

Taking FIG. 4 as an example, the first feedback information codebook includes {b1, b3, b4, b5, b6}, and bi is a feedback information bit corresponding to HARQ process i.

Manner 2: the multiple feedback information bits are obtained according to a time sequence of the multiple transmission resources.

Further, responsive to that the HARQ process indexes corresponding to at least two transmission resources in the multiple transmission resources are the same, a position of a feedback information bit corresponding to the at least two transmission resources in the first feedback information codebook is determined based on a time of a first transmission resource or a last transmission resource in the at least two transmission resources.

Taking FIG. 4 as an example, the first feedback information codebook includes {b3, b5, b4, b6, b1} or {b3, b4, b6, b5, b1}.

Feedback Information Content

The setting of the feedback information content has the following cases.

Case 1: responsive to that the HARQ process indexes corresponding to at least two transmission resources in the multiple transmission resources are the same, at most one SPS PDSCH is received by the terminal on the at least two transmission resources. A feedback information bit corresponding to the at least two transmission resources is set as feedback information of the SPS PDSCH received by the terminal.

Further, for the at least two transmission resources corresponding to the same HARQ process index, after receiving one SPS PDSCH on one of the at least two transmission resources, the terminal does not expect to receive the SPS PDSCH on a transmission resource following the one transmission resource.

Figure 5:
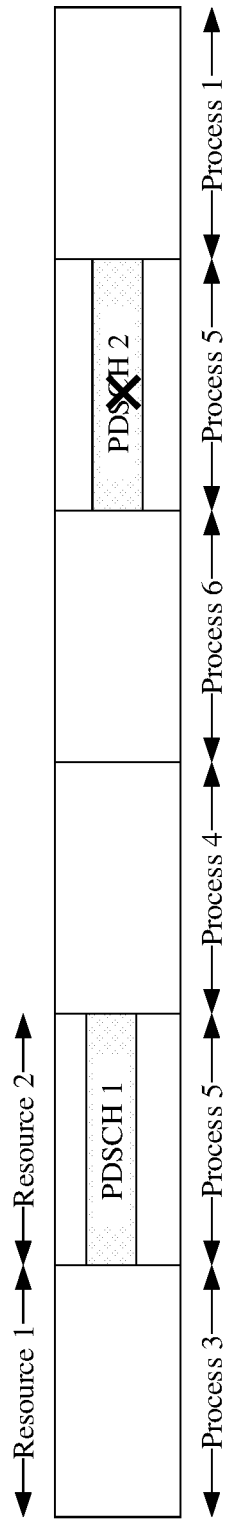
FIG. 5 is a second application schematic diagram according to an embodiment of the present disclosure.

Taking FIG. 5 as an example, after receiving PDSCH1 on resource 2 (the resource corresponding to the process 5), the terminal does not (expect to) receive PDSCH2 on a subsequent resource corresponding to the process 5. Both PDSCH1 and the PDSCH2 herein refer to SPS PDSCH.

Case 2: responsive to that the HARQ process indexes corresponding to at least two transmission resources in the multiple transmission resources are the same, multiple SPS PDSCHs are received by the terminal on the at least two transmission resources, and a feedback information bit corresponding to the at least two transmission resources is set as feedback information corresponding to one of the multiple SPS PDSCHs received by the terminal.

Further, the one of the multiple SPS PDSCHs is the first SPS PDSCH or the last SPS PDSCH. In addition, other SPS PDSCHs, other than the one of the multiple SPS PDSCHs, have no feedback information.

Taking FIG. 5 as an example, after receiving the PDSCH1 on the resource 2 (the resource corresponding to the process 5), the terminal receives the PDSCH2 on the subsequent resource corresponding to the process 5. Then, 1) the terminal maps feedback information corresponding to the PDSCH2 to a feedback information bit corresponding to the HARQ process 5 in the first feedback information codebook, and the PDSCH 1 has no feedback information; or, 2) the terminal maps feedback information corresponding to the PDSCH1 to the feedback information bit corresponding to the HARQ process 5 in the first feedback information codebook, and the PDSCH 2 has no feedback information. In a specific application, there is a requirement of no feedback in URLLC, that is, when the feedback exceeds the delay requirement, the transmission of the feedback information is meaningless. The technical solution of the embodiments of the present disclosure can support scheduling of the same HARQ process again before no feedback, and improve the transmission efficiency.

On the basis of the above technical solution, the first feedback information codebook further includes feedback information of a dynamic scheduling PDSCH. The HARQ process index of the dynamic scheduling PDSCH may be indicated by the DCI for scheduling the PDSCH transmission. Based on this, the following scheme of the embodiments of the present disclosure is proposed. For brief description, the following scheme may be referred to as scheme a). In scheme a), the first feedback information codebook may be designed in the following forms:

a first subcodebook (subcodebook 1), including the feedback information of the dynamic scheduling PDSCH; and a second subcodebook (subcodebook 2), including feedback information corresponding to the multiple transmission resources.

The first subcodebook and the second subcodebook are aggregated to obtain the first feedback information codebook. The second subcodebook may be obtained by the above scheme, and the first subcodebook is determined according to the DAI information field in the DCI for scheduling the PDSCH. It should be noted that the first subcodebook and the second subcodebook may be aggregated in any manner to obtain the first feedback information codebook, for example, the first subcodebook and the second subcodebook are sequentially concatenated to obtain the first feedback information codebook, and for example, the first subcodebook and the second subcodebook are arranged in an alternate manner to obtain the first feedback information codebook.

The first feedback information codebook including the feedback information of the dynamic scheduling PDSCH and the feedback information corresponding to the multiple transmission resources is described in detail below.

Responsive to that one dynamic scheduling PDSCH is received by the terminal on the first transmission resource in the multiple transmission resources, the first feedback information codebook includes the first subcodebook and the second subcodebook.

The first subcodebook includes the feedback information of the dynamic scheduling PDSCH.

The second subcodebook includes feedback information corresponding to transmission resources, other than the first transmission resource, in the multiple transmission resources. In other words, the second subcodebook does not include the feedback information bit corresponding to the first transmission resource.

Figure 6:
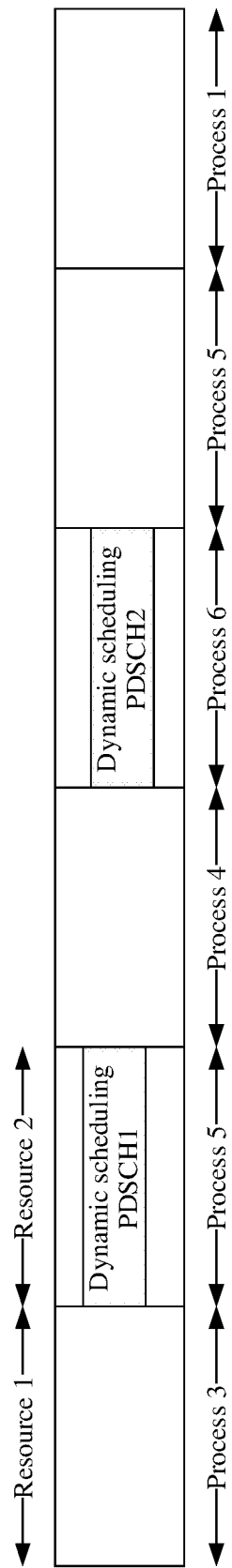
FIG. 6 is a third application schematic diagram according to an embodiment of the present disclosure.

Taking FIG. 6 as an example, the subcodebook 1 includes {a1, a2}, where ai represents feedback information of dynamic scheduling PDSCHi. The subcodebook 2 includes {b1, b3, b4, b5}, where bi represents feedback information of non-dynamic scheduling HARQ process i transmitted through the multiple transmission resources. The first feedback information codebook obtained by concatenating the subcodebook 1 and the subcodebook 2 is {a1, a2, b1, b3, b4, b5}.

Responsive to that a HARQ process index of the dynamic scheduling PDSCH received by the terminal is a first process index and a HARQ process index corresponding to at least one transmission resource in the multiple transmission resources is the first process index, the first feedback information codebook includes the feedback information of the dynamic scheduling PDSCH and feedback information corresponding to transmission resources, other than the at least one transmission resource, in the multiple transmission resources. In other words, the first feedback information codebook includes the feedback information of the dynamic scheduling PDSCH, and does not include the feedback information bit corresponding to the at least one transmission resource.

The first feedback information codebook includes the first subcodebook and the second subcodebook.

The first subcodebook includes the feedback information of the dynamic scheduling PDSCH.

The second subcodebook includes the feedback information corresponding to transmission resources, other than the at least one transmission resource, in the multiple transmission resources. In other words, the second subcodebook does not include a feedback information bit associated with the first process index.

Figure 7:
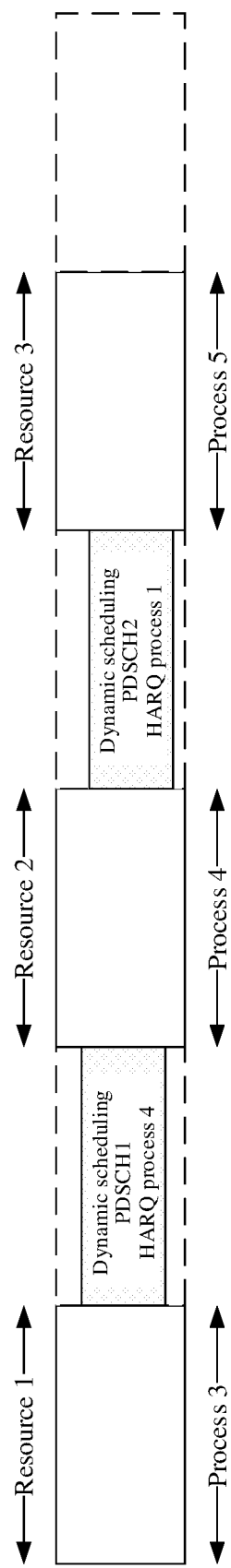
FIG. 7 is a fourth application schematic diagram according to an embodiment of the present disclosure.

Taking FIG. 7 as an example, the resource corresponding to the first dashed box (the resource does not belong to the multiple transmission resources (i.e., SPS transmission resources)) may be used to transmit the dynamic scheduling PDSCH1, and the dynamic scheduling PDSCH1 and the resource 2 correspond to the same HARQ process index (i.e., the process 4). The subcodebook 1 includes {a1, a2}, where ai is the feedback information of the dynamic scheduling PDSCHi. Since the HARQ process index of the dynamic scheduling PDSCH1 is 4, the subcodebook 2 includes {b3, b5}, where bi represents the feedback information of the non-dynamic scheduling HARQ process i transmitted through the multiple transmission resources. The first feedback information codebook obtained by concatenating the subcodebook 1 and the subcodebook 2 is {a1, a2, b3, b5}.

Responsive to that a HARQ process index of the dynamic scheduling PDSCH received by the terminal is a first process index and a HARQ process index corresponding to at least one transmission resource in the multiple transmission resources is the first process index, the terminal does not receive SPS PDSCH on the at least one transmission resource.

Figure 8:
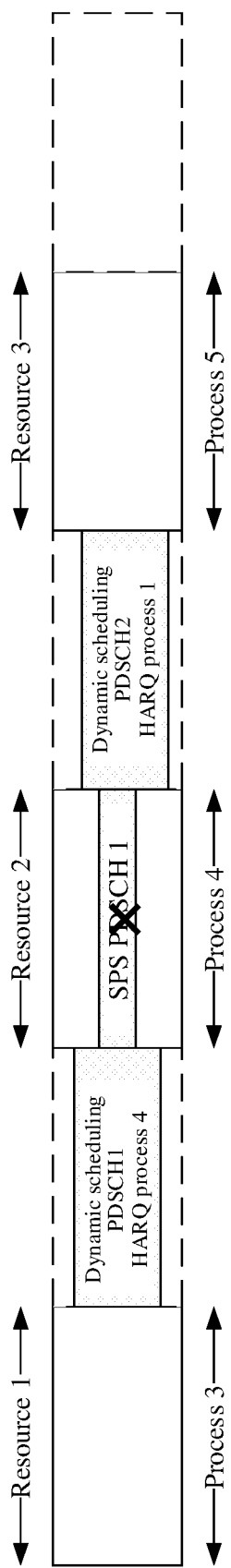
FIG. 8 is a fifth application schematic diagram according to an embodiment of the present disclosure.

Taking FIG. 8 as an example, the resource corresponding to the first dashed box (the resource does not belong to the multiple transmission resources (i.e., SPS transmission resources)) may be used to transmit the dynamic scheduling PDSCH1, and the dynamic scheduling PDSCH1 and the resource 2 correspond to the same HARQ process index (i.e., the process 4). The terminal does not (expect to) receive the SPS PDSCH1 on the resource 2.

Responsive to that a HARQ process index of the dynamic scheduling PDSCH received by the terminal is a first process index and a HARQ process index corresponding to at least one transmission resource in the multiple transmission resources is the first process index, at least one SPS PDSCH is received by the terminal on the at least one transmission resource, and a feedback information bit associated with the first process index is set as follows.

1) The feedback information bits associated with the first process index are set as the feedback information of the dynamic scheduling PDSCH and feedback information of a last PDSCH of the at least one SPS PDSCH received by the terminal.

Figure 9:
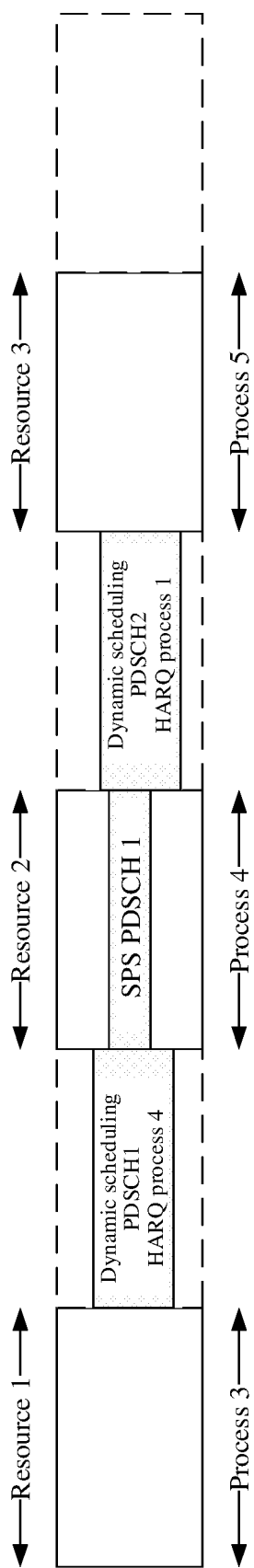
FIG. 9 is a sixth application schematic diagram according to an embodiment of the present disclosure.

Taking FIG. 9 as an example, the resource corresponding to the first dashed box (the resource does not belong to the multiple transmission resources (i.e., SPS transmission resources)) may be used to transmit the dynamic scheduling PDSCH1, and the dynamic scheduling PDSCH1 and the resource 2 correspond to the same HARQ process index (i.e., the process 4). When the terminal receives the SPS PDSCH1 on the resource 2, the subcodebook 1 is {a2}, where ai is feedback information of the dynamic scheduling PDSCHi, and the subcodebook 2 is {b3, b4, b5}, where bi represents the feedback information of non-dynamic scheduling HARQ process i transmitted through the multiple transmission resources. The first feedback information codebook obtained by concatenating the subcodebook 1 and the subcodebook 2 is {a2, b3, b4, b5}.

2) The feedback information bit associated with the first process index is set as the feedback information of the dynamic scheduling PDSCH received by the terminal.

Taking FIG. 9 as an example, the resource corresponding to the first dashed box (the resource does not belong to the multiple transmission resources (i.e., SPS transmission resources)) may be used to transmit dynamic scheduling PDSCH1. The dynamic scheduling PDSCH1 and the resource 2 correspond to the same HARQ process index (i.e., the process 4). When the terminal receives SPS PDSCH1 on the resource 2, the subcodebook 1 is {a1, a2}, where ai is feedback information of the dynamic scheduling PDSCHi, and the subcodebook 2 is {b3, b5}, where bi represents the feedback information of non-dynamic scheduling HARQ process i transmitted through the multiple transmission resources. The first feedback information codebook obtained by concatenating the subcodebook 1 and the subcodebook 2 is {a1, a2, b3, b5}.

Further, on the basis of the above scheme a) of the embodiments of the present disclosure, when a specific condition is satisfied, the embodiments of the present disclosure further provide the following scheme b), in particular, the scheme b) includes the following operations.

The first feedback information codebook includes N feedback information bits, the N feedback information bits are associated with N HARQ process indexes, and a value of N is equal to a maximum number of HARQ processes supported by the terminal. That is, the first feedback information codebook is arranged in order according to the maximum number of HARQ processes supported by the terminal. Taking 16 HARQ processes supported by the terminal as an example, the first feedback information codebook is {b1, b2, . . . , b16}, where bi is the feedback information bit corresponding to the HARQ process i.

In the above scheme, the specific conditions include at least one of the following.

I) The terminal determines that at least one dynamic scheduling PDSCH is lost.

The terminal may determine the loss of the dynamic scheduling PDSCH based on the DAI information field in the DCI. Specifically, the loss of the dynamic scheduling PDSCH means that the corresponding DCI is not received. Therefore, the terminal does not know the HARQ process information of the lost dynamic scheduling PDSCH, thereby causing that the understanding on the generation manner of the first feedback information codebook by the base station and the terminal are inconsistent. In order to avoid such inconsistence, it is agreed to set the first feedback information codebook according to the maximum number of HARQ processes supported by the terminal. In terms of the reception behavior of the base station, the base station may perform blind detection on the first feedback information codebook, that is, the first feedback information codebook generated according to the scheme a) is detected firstly. If the detection is unsuccessful, the first feedback information codebook generated according to the scheme b) is detected. Since the loss of the dynamic scheduling PDSCH is a small probability event, especially the probability for URLLC is $10^{-6}$, the probability that the base station performs blind detection is also very low.

II) The HARQ process indexes corresponding to the multiple transmission resources include the N HARQ process indexes.

III) The number of the multiple transmission resources is greater than or equal to the maximum number of HARQ processes supported by the terminal.

Figure 10:
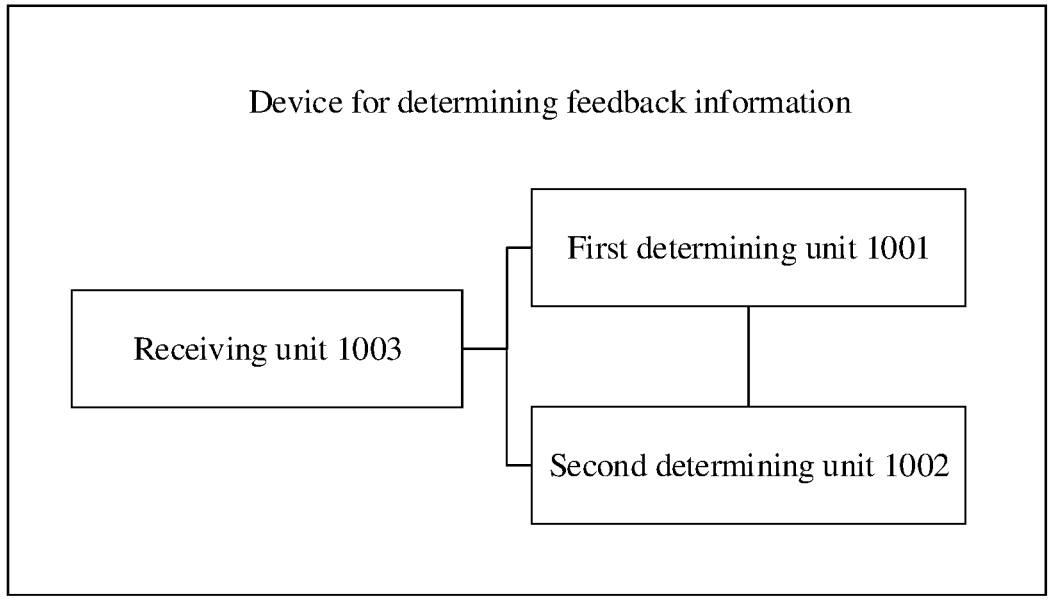
FIG. 10 is a schematic structural composition diagram of a device for determining feedback information according to an embodiment of the present disclosure.

FIG. 10 is a schematic structure diagram of a device for determining feedback information according to an embodiment of the present disclosure. The device for determining feedback information is applied to a terminal, as illustrated in FIG. 10, which includes a first determining unit 1001 and a second determining unit 1002.

The first determining unit 1001 is configured to determine a HARQ process index corresponding to each transmission resource according to a position of each of multiple transmission resources.

The second determining unit 1002 is configured to determine a first feedback information codebook according to HARQ process indexes corresponding to the multiple transmission resources. The first feedback information codebook includes feedback information corresponding to the multiple transmission resources.

In an embodiment, responsive to that HARQ process indexes corresponding to at least two transmission resources in the multiple transmission resources are the same, the at least two transmission resources correspond to a same feedback information bit in the first feedback information codebook.

In an embodiment, the first feedback information codebook includes multiple feedback information bits.

Different feedback information bits in the multiple feedback information bits associate with different HARQ process indexes.

In an embodiment, the multiple feedback information bits are ordered according to an order of HARQ process indexes corresponding to the multiple transmission resources.

In an embodiment, the multiple feedback information bits are obtained according to a time sequence of the multiple transmission resources.

In an embodiment, responsive to that the HARQ process indexes corresponding to at least two transmission resources in the multiple transmission resources are the same, a position of a feedback information bit corresponding to the at least two transmission resources in the first feedback information codebook is determined based on a time of a first transmission resource or a last transmission resource in the at least two transmission resources..

In an embodiment, the multiple transmission resources are allocated to an SPS PDSCH.

In an embodiment, the device further includes a receiving unit 1003.

Responsive to that the HARQ process indexes corresponding to at least two transmission resources in the multiple transmission resources are the same, the receiving unit 1003 receives at most one SPS PDSCH on the at least two transmission resources.

In an embodiment, the device further includes a receiving unit 1003.

Responsive to that the HARQ process indexes corresponding to at least two transmission resources in the multiple transmission resources are the same, the receiving unit 1003 receives multiple SPS PDSCHs on the at least two transmission resources. The feedback information bit corresponding to the at least two transmission resources is set as feedback information corresponding to one of the multiple SPS PDSCHs received by the terminal.

In an embodiment, the one of the multiple SPS PDSCHs is a first SPS PDSCH or a last SPS PDSCH.

In an embodiment, the first feedback information codebook further includes feedback information of a dynamic scheduling PDSCH.

In an embodiment, the first feedback information codebook includes a first subcodebook and a second subcodebook.

The first subcodebook includes the feedback information of the dynamic scheduling PDSCH.

The second subcodebook includes feedback information corresponding to the multiple transmission resources.

In an embodiment, the device further includes a receiving unit 1003.

Responsive to that one dynamic scheduling PDSCH is received by the receiving unit 1003 on a first transmission resource in the multiple transmission resources, the first feedback information codebook includes the first subcodebook and the second subcodebook.

The first subcodebook includes the feedback information of the dynamic scheduling PDSCH.

The second subcodebook includes feedback information corresponding to transmission resources, other than the first transmission resource, in the multiple transmission resources.

In an embodiment, the device further includes a receiving unit 1003.

Responsive to that a HARQ process index of the dynamic scheduling PDSCH received by the receiving unit 1003 is a first process index and a HARQ process index corresponding to at least one transmission resource in the multiple transmission resources is the first process index, the first feedback information codebook includes the feedback information of the dynamic scheduling PDSCH and feedback information corresponding to transmission resources, other than the at least one transmission resource, in the multiple transmission resources.

In an embodiment, the first feedback information codebook includes the first subcodebook and the second subcodebook.

The first subcodebook includes the feedback information of the dynamic scheduling PDSCH.

The second subcodebook includes the feedback information corresponding to transmission resources, other than the at least one transmission resource, in the multiple transmission resources.

In an embodiment, the device further includes a receiving unit 1003.

Responsive to that a HARQ process index of the dynamic scheduling PDSCH received by the receiving unit 1003 is a first process index and a HARQ process index corresponding to at least one transmission resource in the multiple transmission resources is the first process index, the terminal does not receive SPS PDSCH on the at least one transmission resource.

In an embodiment, the device further includes a receiving unit 1003.

Responsive to that a HARQ process index of the dynamic scheduling PDSCH received by the receiving unit 1003 is a first process index and a HARQ process index corresponding to at least one transmission resource in the multiple transmission resources is the first process index, at least one SPS PDSCH is received by the receiving unit on the at least one transmission resource:

feedback information bits associated with the first process index are set as the feedback information of the dynamic scheduling PDSCH and feedback information of a last PDSCH of the at least one SPS PDSCH received by the terminal; or a feedback information bit associated with the first process index is set as the feedback information of the dynamic scheduling PDSCH received by the terminal.

In an embodiment, when a specific condition is satisfied, the first feedback information codebook includes N feedback information bits, the N feedback information bits are associated with N HARQ process indexes, and a value of N is equal to a maximum number of HARQ processes supported by the terminal.

In an embodiment, the particular condition includes at least one of the following.

The terminal determines that at least one dynamic scheduling PDSCH is lost.

The HARQ process indexes corresponding to the multiple transmission resources include N HARQ process indexes.

The number of the multiple transmission resources is greater than or equal to the maximum number of HARQ processes supported by the terminal.

It should be understood by those skilled in the art that the description of the above device for determining feedback information of the embodiments of the present disclosure may be understood with reference to the related description of the method for determining feedback information of the embodiments of the present disclosure.

Figure 11:
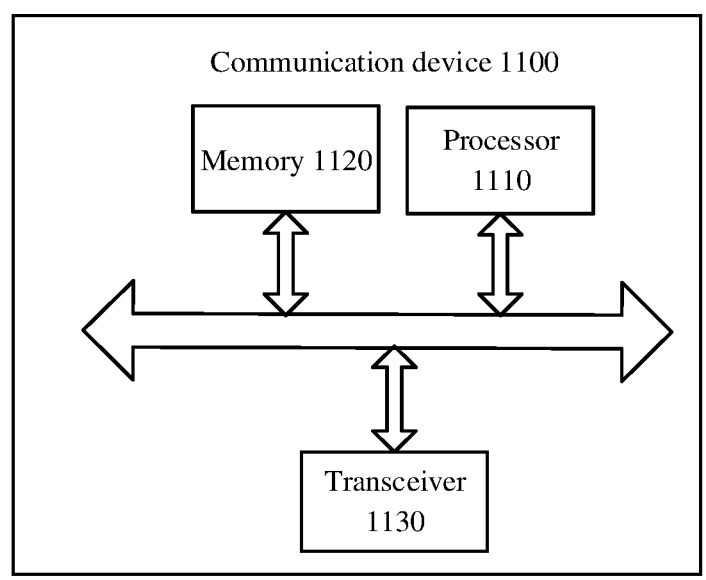
FIG. 11 is a schematic structure diagram of a communication device according to an embodiment of the present disclosure.

FIG. 11 is a schematic structure diagram of a communication device 1100 according to an embodiment of the present disclosure. The communication device may be a terminal. The communication device 1100 illustrated in FIG. 11 includes a processor 1110. The processor 1110 may call a computer program from a memory and run the computer program to implement the method in the embodiments of the present disclosure.

In one example, as illustrated in FIG. 11, the communication device 1100 may also include a memory 1120. The processor 1110 may call a computer program from the memory 1120 and run the computer program to implement the method in the embodiments of the present disclosure.

The memory 1120 may be a separate device from the processor 1110, or may be integrated into the processor 1110.

In one example, as illustrated in FIG. 11, the communication device 1100 may also include a transceiver 1130. The processor 1110 may control the transceiver 1130 to communicate with another device, specifically, to transmit information or data to another device, or receive information or data from another device.

The transceiver 1130 may include a transmitter and a receiver. The transceiver 1130 may further include one or more antennas.

In one example, the communication device 1100 may specifically be the network device in the embodiments of the present disclosure. The communication device 1100 may implement corresponding processes implemented by the network device in each method of the embodiments of the present disclosure, which will not be elaborated herein for brief description.

In one example, the communication device 1100 may specifically be the mobile terminal/terminal in the embodiments of the present disclosure. The communication device 1100 may implement corresponding processes implemented by the mobile terminal/terminal in each method of the embodiments of the disclosure, which will not be elaborated herein for brief description.

Figure 12:
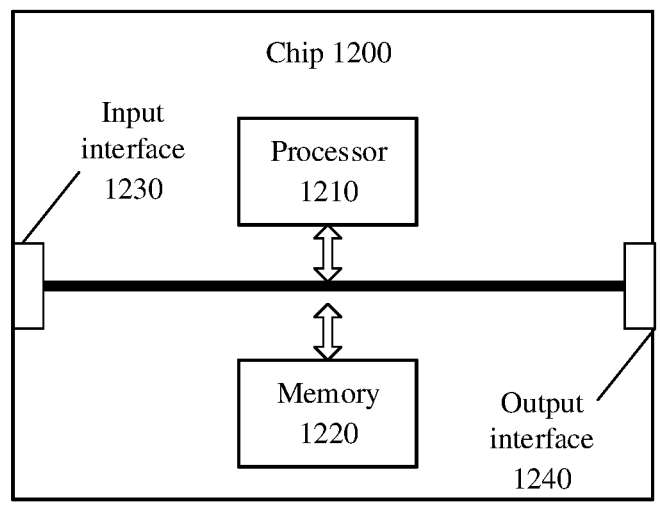
FIG. 12 is a schematic structure diagram of a chip according to an embodiment of the present disclosure.

FIG. 12 is a schematic structure diagram of a chip according to an embodiment of the present disclosure. The chip 1200 illustrated in FIG. 12 includes a processor 1210. The processor 1210 can call a computer program from a memory and run the computer program to implement the method in the embodiments of the present disclosure.

In one example, as illustrated in FIG. 12, the chip 1200 may also include a memory 1220. The processor 1210 may call a computer program from the memory 1220 and run the computer program to implement the method in the embodiments of the present disclosure.

The memory 1220 may be a separate device from the processor 1210, or may be integrated in the processor 1210.

In one example, the chip 1200 may also include an input interface 1230. The processor 1210 may control the input interface 1230 to communicate with another device or chip, and specifically, may acquire information or data transmitted by another device or chip.

In one example, the chip 1200 may also include an output interface 1240. The processor 1210 may control the output interface 1240 to communicate with another device or chip, and specifically, may output information or data to another device or chip.

In one example, the chip may be applied to the network device in the embodiments of the present disclosure. The chip may implement corresponding processes implemented by the network device in each method of the embodiments of the disclosure, which will not be elaborated herein for brief description.

In one example, the chip may be applied to the mobile terminal/terminal in the embodiments of the present disclosure. The chip may implement corresponding processes implemented by the mobile terminal/terminal in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 13:
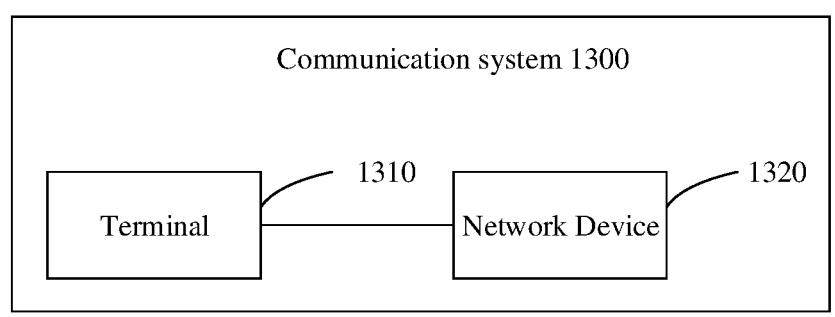
FIG. 13 is a schematic block diagram of a communication system according to an embodiment of the present disclosure.

FIG. 13 is a schematic block diagram of a communication system 1300 according to an embodiment of the present disclosure. As illustrated in FIG. 13, the communication system 1300 includes a terminal 1310 and a network device 1320.

The terminal 1310 may implement the corresponding functions implemented by the terminal in the above methods, and the network device 1320 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It may be understood that the memory in the embodiment of the disclosure may be a volatile memory or a non-volatile memory, or may include both the volatile and nonvolatile memories. The nonvolatile memory may be an ROM, a PROM, an EPROM, an EEPROM, or a flash memory. The volatile memory may be an RAM, which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other proper types.

The embodiments of the disclosure also provide a computer-readable storage medium for storing a computer program.

In one example, the computer-readable storage medium may be applied to the network device of the embodiments of the disclosure. The computer program may enable a computer to perform the corresponding processes implemented by the network device in each method of the embodiments of the disclosure, which will not be elaborated herein for brief description.

In one example, the computer-readable storage medium may be applied to the mobile terminal/terminal of the embodiments of the disclosure. The computer program may enable a computer to perform the corresponding processes implemented by the mobile terminal/terminal in each method of the embodiments of the disclosure, which will not be elaborated herein for brief description.

The embodiments of the disclosure also provide a computer program product. The computer program product includes a computer program instruction.

In one example, the computer program product may be applied to the network device of the embodiments of the disclosure. The computer program instruction may enable a computer to perform the corresponding processes implemented by the network device in each method of the embodiments of the disclosure, which will not be elaborated herein for brief description.

In one example, the computer program product may be applied to the mobile terminal/terminal of the embodiments of the disclosure. The computer program instruction may enable a computer to perform the corresponding processes implemented by the mobile terminal/terminal in each method of the embodiments of the disclosure, which will not be elaborated herein for brief description.

The embodiments of the disclosure also provide a computer program.

In one embodiment, the computer program may be applied to the network device of the embodiments of the disclosure. The computer program, when running in a computer, enables the computer to perform the corresponding processes implemented by the network device in each method of the embodiments of the disclosure, which will not be elaborated herein for brief description.

In one example, the computer program may be applied to the mobile terminal/terminal of the embodiments of the disclosure. The computer program, when running in a computer, enables the computer to perform the corresponding processes implemented by the mobile terminal/terminal in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining feedback information, comprising:
   determining, by a terminal according to a position of each of a plurality of transmission resources, a hybrid automatic repeat request (HARQ) process index corresponding to each transmission resource; and
   determining, by the terminal, a first feedback information codebook according to HARQ process indexes corresponding to the plurality of transmission resources, wherein the first feedback information codebook comprises feedback information corresponding to the plurality of transmission resources, wherein the plurality of transmission resources are allocated to a semi-persistent scheduling (SPS) physical downlink shared channel (PDSCH);
   wherein responsive to that the HARQ process indexes corresponding to at least two transmission resources in the plurality of transmission resources are a first process index, a feedback information bit associated with the first process index in the first feedback information codebook is set as feedback information corresponding to one of a plurality of SPS PDSCHs received on the at least two transmission resource; and
   the one of the plurality of SPS PDSCH is a first SPS PDSCH or a last SPS PDSCH.

2. The method of claim 1, wherein the first feedback information codebook comprises a plurality of feedback information bits; and
   the plurality of feedback information bits are ordered according to an order of the HARQ process indexes corresponding to the plurality of transmission resources.

3. The method of claim 1, wherein the first feedback information codebook further comprises feedback information of a dynamic scheduling PDSCH.

4. The method of claim 3, wherein the first feedback information codebook comprises:
   a first subcodebook comprising the feedback information of the dynamic scheduling PDSCH; and
   a second subcodebook comprising feedback information corresponding to the plurality of transmission resources.

5. The method of claim 4, wherein responsive to that a HARQ process index of the dynamic scheduling PDSCH received by the terminal is a first process index and a HARQ process index corresponding to at least one transmission resource in the plurality of transmission resources is the first process index, the first feedback information codebook comprises the feedback information of the dynamic scheduling PDSCH and feedback information corresponding to transmission resources, other than the at least one transmission resource, in the plurality of transmission resources.

6. The method of claim 5, wherein the first feedback information codebook comprises:
   the first subcodebook comprising the feedback information of the dynamic scheduling PDSCH; and
   the second subcodebook comprising the feedback information corresponding to transmission resources, other than the at least one transmission resource, in the plurality of transmission resources.

7. The method of claim 4, wherein responsive to that a HARQ process index of the dynamic scheduling PDSCH received by the terminal is a first process index and a HARQ process index corresponding to at least one transmission resource in the plurality of transmission resources is the first process index, the terminal does not receive SPS PDSCH on the at least one transmission resource.

8. The method of claim 4, wherein responsive to that a HARQ process index of the dynamic scheduling PDSCH received by the terminal is a first process index and a HARQ process index corresponding to at least one transmission resource in the plurality of transmission resources is the first process index, at least one SPS PDSCH is received by the terminal on the at least one transmission resource:
   feedback information bits associated with the first process index are set as the feedback information of the dynamic scheduling PDSCH and feedback information of a last PDSCH of the at least one SPS PDSCH received by the terminal; or
   a feedback information bit associated with the first process index is set as the feedback information of the dynamic scheduling PDSCH.

9. A device for determining feedback information, comprising:
   a processor; and
   a memory for storing a computer program executable on the processor,
   wherein the processor is configured to:
   determine a hybrid automatic repeat request (HARQ) process index corresponding to each transmission resource according to a position of each of a plurality of transmission resources; and
   determine a first feedback information codebook according to HARQ process indexes corresponding to the plurality of transmission resources, wherein the first feedback information codebook comprises feedback information corresponding to the plurality of transmission resources, wherein the plurality of transmission resources are allocated to a semi-persistent scheduling (SPS) physical downlink shared channel (PDSCH);
   wherein responsive to that the HARQ process indexes corresponding to at least two transmission resources in the plurality of transmission resources are a first process index, a feedback information bit associated with the first process index in the first feedback information codebook is set as feedback information corresponding to one of a plurality of SPS PDSCHs on the at least two transmission resources; and
   the one of the plurality of SPS PDSCH is a first SPS PDSCH or a last SPS PDSCH.

10. The device of claim 9, wherein the first feedback information codebook comprises a plurality of feedback information bits; and
    the plurality of feedback information bits are ordered according to an order of the HARQ process indexes corresponding to the plurality of transmission resources.

11. The device of claim 9, wherein the first feedback information codebook comprises:
    a first subcodebook comprising feedback information of a dynamic scheduling PDSCH; and
    a second subcodebook comprising feedback information corresponding to the plurality of transmission resources.

12. The device of claim 11, further comprising a transceiver, wherein
    responsive to that a HARQ process index of the dynamic scheduling PDSCH received by the transceiver is a first process index and a HARQ process index corresponding to at least one transmission resource in the plurality of transmission resources is the first process index, the transceiver does not receive SPS PDSCH on the at least one transmission resource.

13. The device of claim 11, further comprising a transceiver,
wherein responsive to that a HARQ process index of the dynamic scheduling PDSCH received by the transceiver is a first process index and a HARQ process index corresponding to at least one transmission resource in the plurality of transmission resources is the first process index, at least one SPS PDSCH is received by the transceiver on the at least one transmission resource:
feedback information bits associated with the first process index are set as the feedback information of the dynamic scheduling PDSCH and feedback information of a last PDSCH of the at least one SPS PDSCH received by the transceiver; or
a feedback information bit associated with the first process index is set as the feedback information of the dynamic scheduling PDSCH.

14. The device of claim 9, further comprising a transceiver, wherein
responsive to that a HARQ process index of a dynamic scheduling PDSCH received by the transceiver is a first process index and a HARQ process index corresponding to at least one transmission resource in the plurality of transmission resources is the first process index, the first feedback information codebook comprises feedback information of a dynamic scheduling PDSCH and feedback information corresponding to transmission resources, other than the at least one transmission resource, in the plurality of transmission resources.

15. The device of claim 14, wherein the first feedback information codebook comprises:
the first subcodebook comprising the feedback information of the dynamic scheduling PDSCH; and
the second subcodebook comprising the feedback information corresponding to transmission resources, other than the at least one transmission resource, in the plurality of transmission resources.

* * * * *